(12) United States Patent
Stammer et al.

(10) Patent No.: US 10,451,307 B2
(45) Date of Patent: Oct. 22, 2019

(54) FLOAT DRAIN

(71) Applicant: Hoffman Enclosures, Inc., Anoka, MN (US)

(72) Inventors: Scott D. Stammer, Champlin, MN (US); La Her, Columbus, MN (US); Jamie Livgard, Big Lake, MN (US); Michael J. Koehler, Ramsey, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 89 days.

(21) Appl. No.: 15/489,543

(22) Filed: Apr. 17, 2017

(65) Prior Publication Data

US 2017/0299078 A1   Oct. 19, 2017

Related U.S. Application Data

(60) Provisional application No. 62/323,518, filed on Apr. 15, 2016.

(51) Int. Cl.
*F24F 13/22* (2006.01)
*F16T 1/20* (2006.01)
(Continued)

(52) U.S. Cl.
CPC .............. *F24F 13/222* (2013.01); *F16T 1/20* (2013.01); *F16T 1/22* (2013.01); *F16T 1/383* (2013.01); *F16B 21/04* (2013.01); *F16K 24/046* (2013.01)

(58) Field of Classification Search
CPC ......... F01N 3/005; F16J 13/12; F16K 24/046; F16L 55/07; F16T 1/20; F16T 1/22;
(Continued)

(56) References Cited

U.S. PATENT DOCUMENTS 7,318 A * 4/1850 Brown ................ E21B 14/046
                                                285/396
859,540 A 7/1907 Bonnell
(Continued)

FOREIGN PATENT DOCUMENTS

| CN | 205001831 U | 1/2016 |
|----|-------------|--------|
| GB | 2286207 A | 8/1995 |
| JP | 2013185386 A | 9/2013 |

OTHER PUBLICATIONS

PENTAIR Equipment Protection Hoffman Spectracool Hazardous Location Indoor/Outdoor Air-conditioners; retrieved from the Internet: <https://www.pentairprotect.com/en/hoffman/air-conditioners/spectracool-hazardous-location-indoor-outdoor-401501>; 2 pages; Copyright 2017 Pentair.
(Continued)

*Primary Examiner* — Mary E McManmon
*Assistant Examiner* — Richard K. Durden
(74) *Attorney, Agent, or Firm* — Quarles & Brady LLP (57) ABSTRACT

A float drain for an enclosure can include a basket to collect liquid from the enclosure, a sealing structure surrounding an outlet of the basket, and a float configured to seat against the sealing surface to prevent fluid flow out of the outlet and to rise off of the sealing surface due to buoyancy forces as the liquid collects in the basket. The float drain can include other features, including: ribs or other protrusions extending into an interior are of the basket to space the float apart from an inner wall of the basket; an angled orientation of the sealing surface; and a trough, at least partly defined by the sealing structure, to collect debris.

17 Claims, 10 Drawing Sheets

(51) Int. Cl.
*F16B 21/04* (2006.01)
*F16T 1/22* (2006.01)
*F16T 1/38* (2006.01)
*F16K 24/04* (2006.01)

(58) Field of Classification Search
CPC ..... F16T 1/383; F16T 1/45; E03F 2005/0417; Y10T 137/7326; Y10T 137/791
USPC ............. 210/119, 164; 285/140.1, 209
See application file for complete search history.

(56) References Cited

U.S. PATENT DOCUMENTS

| | | | |
|---|---|---|---|
| 1,176,785 A | | 3/1916 | Stielow |
| 1,334,079 A | * | 3/1920 | Callicott .................. F16T 1/22 137/193 |
| 2,199,673 A | | 5/1940 | Ronning |
| 2,598,706 A | | 6/1952 | Manning |
| 2,746,476 A | | 5/1956 | Dopkeen |
| 2,757,752 A | | 8/1956 | Kaufman |
| 3,209,738 A | | 10/1965 | Powers |
| 3,232,644 A | * | 2/1966 | Pfeifer .................. B60T 13/567 285/194 |
| 3,454,005 A | | 7/1969 | Eubanks et al. |
| 3,610,275 A | | 10/1971 | Determan et al. |
| 3,759,281 A | | 9/1973 | Falcuta |
| 4,197,966 A | | 4/1980 | Wadensten et al. |
| 4,327,764 A | | 5/1982 | Biederman et al. |
| 4,627,460 A | | 12/1986 | Eising |
| 4,640,304 A | | 2/1987 | Looney |
| 4,856,550 A | | 8/1989 | Smelcer |
| 5,101,821 A | | 4/1992 | Carle, Jr. |
| 5,115,798 A | | 5/1992 | Moore, Jr. et al. |
| 5,146,947 A | | 9/1992 | Vetrini |
| 5,201,340 A | | 4/1993 | Teepe |
| 5,398,677 A | | 3/1995 | Smith |
| 5,421,360 A | | 6/1995 | Castaneda et al. |
| 5,662,138 A | | 9/1997 | Wang |
| 5,797,426 A | | 8/1998 | Powell |
| 6,131,605 A | | 10/2000 | Kothe et al. |
| 6,435,271 B1 | * | 8/2002 | Pavlin .................. F28D 9/005 165/167 |
| 6,564,820 B2 | | 5/2003 | Christman |
| 6,942,255 B2 | * | 9/2005 | Pickering .............. F16L 37/252 285/136.1 |
| 8,978,690 B2 | | 3/2015 | Hubbard, Sr. et al. |
| 2003/0098061 A1 | | 5/2003 | Stuchlik |
| 2006/0180205 A1 | | 8/2006 | Gosch |
| 2011/0067765 A1 | | 3/2011 | Army, Jr. et al. |
| 2013/0118608 A1 | * | 5/2013 | Holiday .................. F16T 1/00 137/409 |

OTHER PUBLICATIONS

Kooltronic Thermal Management for Enclosures Air-conditioners; retrieved from the Internet: <http://www.kooltronic.com/ac-hl40l.aspx>; 2 pages; Copyright 1996-2017 Kooltronic, Inc.
Armstrong International Liquid Drainers; retrieved from the Internet: <https://www.armstronginternational.com/products-systems/steam-condensate/liquid-drainers>; 3 pages.
McAps Automation & Power Incorporated Air-conditioning; retrieved from the Internet: <http://www.mcaps-inc.com/p-51783-10-000-btu-ac-for-class-1-division-1-and-2-or-atex-zone-1-zone-21-or-zone-2-purged-enclou.aspx>; 2 pages.
ICEqube Hazardous Locatino Air-conditioners; retrieved from the Internet: <http://www.iceqube.com/hazardousdutyairconditioners.asp>; 4 pages; Copyright 2017 Ice Qube Inc.
Matticks Industries, Inc. Z-Guard Cabinet Mount Air Conditioning for Hazardous Locations; retrieved from the Internet: <http://www.matticks.com/zguard-cabinet-air-conditioning-hazardous-location.htm>; 9 pages.
Pentair Equipment Protection Hoffman Hazardous Location Breather Drains; retrieved from the Internet: <http://www.pentairprotect.com/en/hoffman/Products/Hazardous-Location-Breather-Drains>; 2 pages; Copyright 2017 Pentair.
Eaton Breathers and Drains; retrieved from the Internet: <http://www.cooperindustries.com/content/public/en/crouse-hinds/productst/fittingsglands/conduit-unions/breathers_and_drains_html>; 2 pages; Copyright 2017 Eaton.
Pentair Equipment Protection Hoffman H20MIT Vent Drains; retrieved from the Internet: <http://www.pentairprotect.com/en/hoffman/Products/H2OMIT-Vent-Drains>; 2 pages; Copyright 2017 Pentair.

* cited by examiner

FLOAT DRAIN

RELATED APPLICATIONS

This application claims priority to U.S. Provisional Application No. 62/323,518 filed Apr. 15, 2016, the entire disclosure of which is incorporated herein by reference.

BACKGROUND

In different applications, it may be useful to drain liquids from an enclosure with minimal corresponding loss of gases. For example, in many installations, enclosures can contain electrical equipment that generates heat. Accordingly, to maintain a desired temperature range (e.g., to prevent damage to thermally sensitive components), the interiors of the enclosures may need to be cooled. In some cases, air conditioners can be installed to provide appropriate cooling. However, the operating of air conditioners can cause moisture in the air inside the enclosure to condense. Accordingly, use of air conditioners (or various other factors), can result in liquids (e.g., liquid water condensate) that need to be removed from an enclosure.

In many conventional systems, drains for removing liquid from an enclosure (e.g., conventional condensate drains) can also allow gas to move out of (or into) the enclosure. In some installations, this may be undesirable. For example, some configurations of purge and pressurization systems (e.g., for use in hazardous locations) can prevent environmental gases from entering an enclosure by pressurizing the internal area of an enclosure. In these systems, the pressures provided (e.g., 0 to 1000 Pa) can sometimes result in significantly costly losses of pressurized air, particularly if flow rates become sufficiently large to overcome associated leakage compensation systems.

In some configurations, conventional drains can be provided with traps, which can help to reduce loss of air (e.g., due to internal pressurization of an enclosure). However, conventional drains can suffer from various deficiencies. For example, conventional drains with traps can require priming to seal, via a small amount of water being dispensed (and maintained) within the trap. Over time, this water can evaporate or otherwise be lost, thereby allowing the traps to dry out and air to escape.

SUMMARY

Embodiments of the invention can provide a float drain that allows water to drain from an enclosure (e.g., a pressurized enclosure), while substantially preventing air from escaping through the float drain, and generally not requiring priming to provide an appropriate seal. In some embodiments, for example, a float drain can include a drain body configured to be removably attachable to an enclosure. The assembly can further include a float configured to seat on a sealing surface in the drain body. The float can exhibit sufficiently low density and sufficiently large size so that the buoyancy force created by accumulated condensate water (or other liquid) in the drain body can overcome the force of the enclosure's air pressure, thereby lifting the float off the sealing surface, and allowing water to drain out of the pressurized compartment. When sufficient water has drained, the float can automatically re-reseat on the seal to prevent air leakage from the enclosure.

In this regard, for example, the float can prevent air from leaking from the enclosure even when no condensate is present The assembly can also minimize the buildup of condensation in the system. Further, the assembly can be configured to be resistant to detrimental fouling from infiltration of debris. For example, the assembly can be configured to allow debris (e.g., particles of various sizes and geometries) to pass around the float and collect in a trough at the bottom of the valve body, so that the debris remains out of the way of operation (e.g., movement and sealing) of the ball.

In some embodiments, if service is needed, the assembly (or components thereof) can easily be removed, cleaned, and reinstalled from the exterior of an enclosure. For example, embodiments of the invention can include a drain body with a twist-lock or a threaded configuration, in order to allow the drain body to be readily attached to and removed from a relevant enclosure.

Some embodiments of the invention can provide a float drain for an enclosure. The float drain can include a basket to collect liquid from the enclosure, a sealing structure, and a float. The sealing structure can extend away from a bottom wall of the basket and can include a sealing surface that surrounds an outlet of the basket. The float can be configured to: in a sealing configuration, seat against the sealing surface to prevent fluid flow out of the outlet; and rise off of the sealing surface, due to buoyancy forces from the liquid as the liquid collects in the basket, to allow the liquid to flow out of the outlet. The basket can include a plurality of ribs that extend at least partly radially inwardly into an interior area of the basket to at least partly separate the float from an inner wall of the basket.

Some embodiments of the invention can provide another float drain for an enclosure. The float drain can include a basket to collect liquid from an enclosure, a sealing, structure that includes a sealing surface surrounding an outlet of the basket, and a float. The float can be configured to: seat against the sealing surface to prevent fluid flow out of the outlet; and rise under buoyancy forces from the liquid to allow the liquid to flow out of the outlet. The sealing structure can include a projecting wall that extends away from a bottom wall of the basket to support the sealing surface. The projecting wall can define, in cooperation with an inner wall of the basket, a trough to collect debris carried by the liquid.

Some embodiments of the invention can provide yet another float drain for an enclosure that is internally pressurized. The float drain can include a basket to collect liquid from an enclosure, a sealing structure, and a ball float. An inner wall of the basket can include a plurality of protrusions that extend at least partly radially inwardly away from the inner wall. The sealing structure can include a projecting wall and a sealing surface. The projecting wall can extend away from a bottom wall of the basket to support the sealing surface, and can define, in cooperation with the inner wall of the basket, a trough to collect debris carried by the liquid. The sealing surface can surround an outlet of the basket and can be angled towards the bottom wall, from a perspective moving radially inwardly from the projecting wall towards the outlet. The ball float can be configured to: seat against the sealing surface to prevent fluid flow out of the outlet; and rise off of the sealing surface, due to buoyancy forces from the liquid as the liquid collects in the basket, to allow the liquid to flow out of the outlet. The ball float can be at least partly spaced apart from the inner wall of the basket by the ribs of the basket, as the ball float moves within the basket.

The foregoing and other advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and the like are used broadly and encompass both direct and indirect mountings, connections, supports, couplings, and so on. Further, "connected" and "coupled" and the like are not restricted to physical or mechanical connections or couplings.

As used herein, unless otherwise specified or limited, "at least one of A, B, and C," and the like, is meant to indicate A, or B, or C, or any combination of A, B, and/or C. As such, these and similar phrases can include single or multiple instances of A, B, and/or C, and, in the case that any of A, B, and/or C indicates a category of elements, single or multiple instances of any of the elements of the category (or categories).

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, it can be useful to provide for a drain that seals an enclosure to prevent gases (e.g., pressurized air) from escaping, while also allowing liquids to drain from the enclosure. Embodiments of the invention can provide these (or other) benefits. For example, some embodiments of the invention can provide a system for forming an air-tight liquid drain in an enclosure that is equipped with a purge and pressurization system that pressurizes all or part of the enclosure with pressurized air.

Some discussion herein presents embodiments of the invention in the context of pressurized hazardous-location enclosures. However, this context is not intended to necessarily limit the scope of the invention. For example, embodiments of the invention can be configured for installation with any compartment or component of an enclosure in which liquid to be drained and/or pressurized gases may be present, including main or secondary cabinets, air conditioner enclosures, and so on.

Figure 1A:
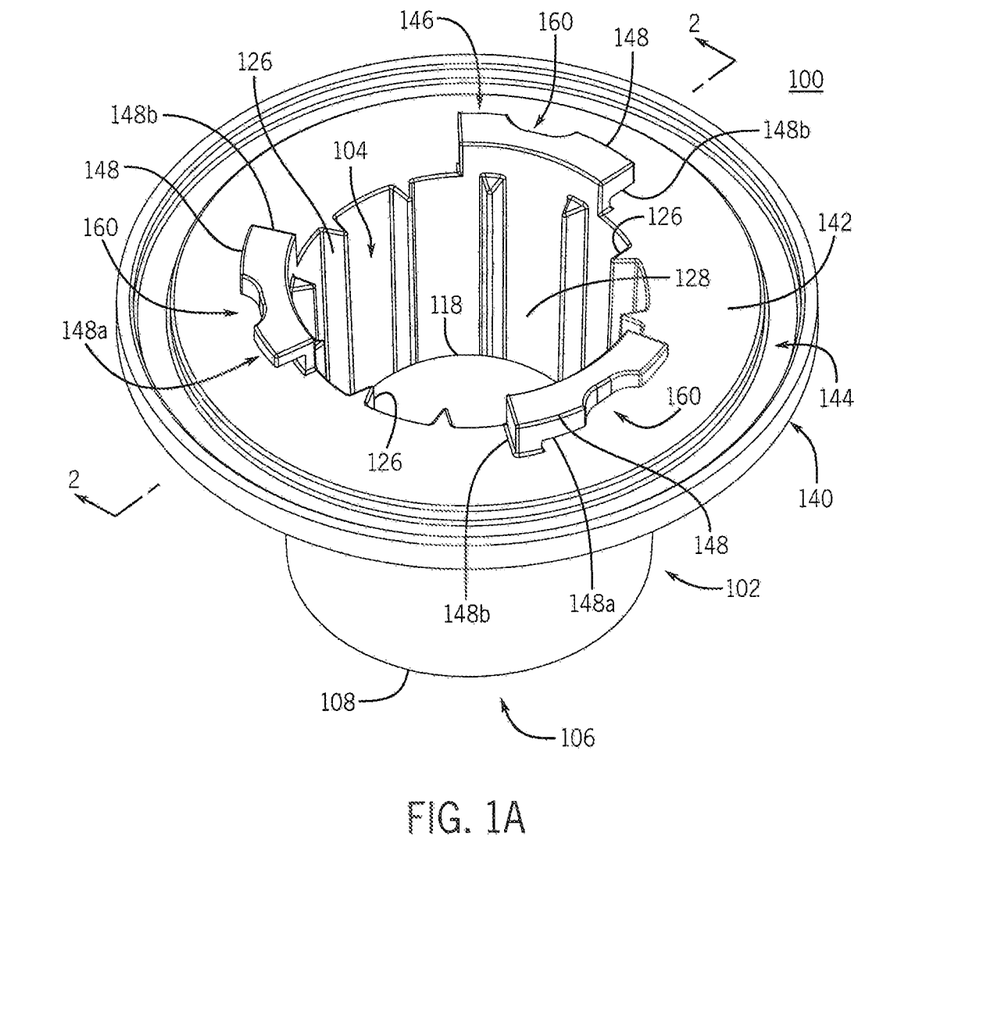
FIG. 1A is perspective view of a ball float drain for an enclosure, according to one embodiment of the invention.
Figure 1B:
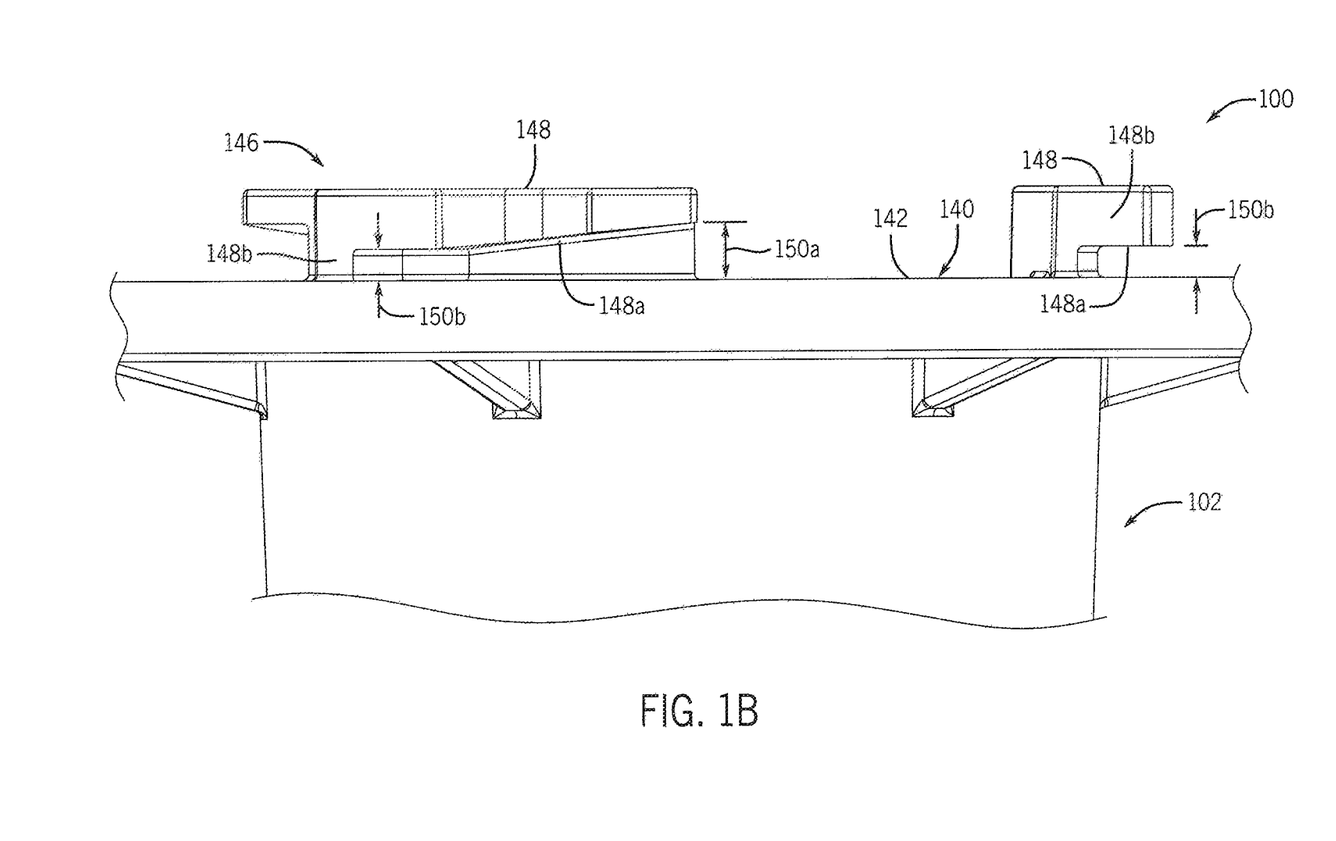
FIG. 1B is a partial enlarged front elevation view of a top portion of the ball float drain of FIG. 1A.
Figure 2:
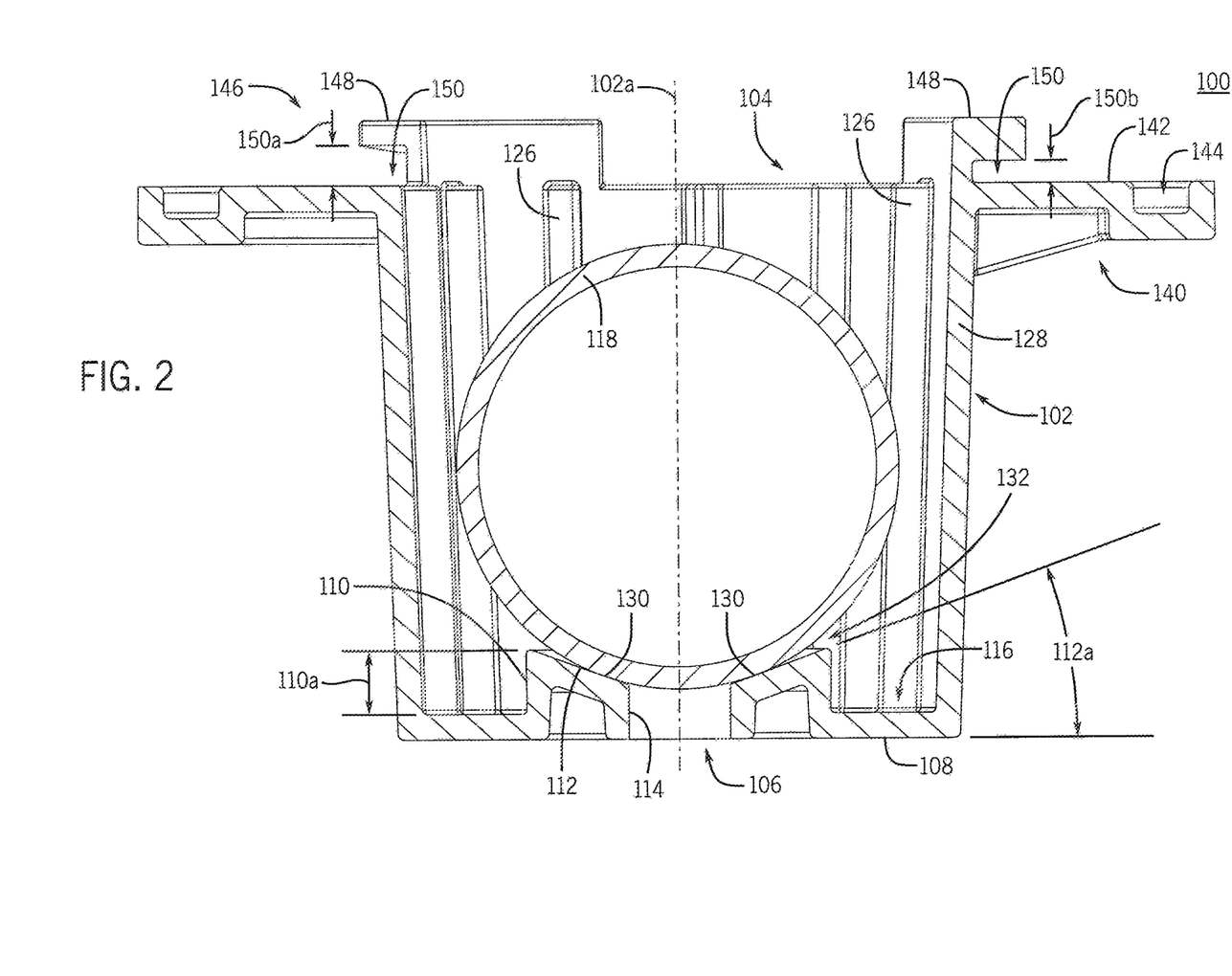
FIG. 2 is a sectional view of the ball float drain of FIG. 1A, taken along plane 2-2 of FIG. 1.

FIGS. 1A, 1B, and 2 illustrate a float drain 100 according to one embodiment of the invention. Generally, the float drain 100 is configured as a ball float drain to be installed in an enclosure in order to drain water or other liquid from the enclosure, including where the enclosure is internally pressurized (e.g., using pressurized air).

The float drain 100 includes a drain body with a basket 102 that defines a generally circular inlet 104, and a generally circular, but somewhat smaller, outlet 106. The basket 102 can be forced with slightly angled, generally linear side walls to define a generally frustoconical section that is symmetric about an axis 102a (see FIG. 2), and that includes a larger width at the inlet end than at the outlet end. In this regard, the basket 102 can define an axial direction for the float drain 100, which can extend generally in parallel with the axis 102a. (A radial direction can be similarly defined to be generally perpendicular to the axial direction.) The frustoconical configuration of the basket 102 can be useful, for example, in order to allow for relatively inexpensive manufacturing, as well as to help retain a ball within the basket 102 (as also discussed below), and provide for relatively easy installation.

In the embodiment illustrated, the outlet 106 is generally defined by a sealing structure that extends axially from a bottom wall 108 of the basket 102 into the interior space of the basket 102. In particular, the sealing structure of the illustrated embodiment is integrally formed with the bottom wall 108 and includes a projecting wall 110, a valve seat wall 112, and a channel wall 114. The projecting wall 110 extends generally in the axial direction to a distance 110a away from the bottom wall 108, so as to define a generally annular trough 116 at the bottom end of the basket 102. In the embodiment illustrated, the projecting wall 110 also intersects with the valve seat wall 112 at the distance 110a from the bottom wall 108.

From the intersection with the projecting wall 110, the valve seat wall 112 slopes inwardly and downwardly at an angle 112a relative to a plane perpendicular to the axis 102a (e.g., a plane defined by the bottom wall 108). In the illustrated embodiment, the valve seat wall 112 is locally flat so as to also define a generally frustoconical section. In some configurations the valve seat wall can be curved (e.g., convex or concave) or otherwise contoured (e.g., can include a concave or convex angle. In this regard, for example, some valve seat walls can be considered as exhibiting multiple angles (e.g., rather than the single angle 112a of the illustrated embodiment).

At a radially inner end, the valve seat wall 112 intersects the channel wall 114, with the channel wall 114 extending axially away from the valve seat wall 112 to define a flow channel for the outlet 106. In the embodiment illustrated, the valve seat wall 112, like the projecting wall 110, generally extends in parallel with an axial direction defined by the basket 102.

In some embodiments, the angle 112a can be approximately 20 degrees, or can be selected from between 10 degrees and 30 degrees, from between 5 degrees and 45 degrees, or from another range of angles. Likewise, in some embodiments, the distance 110a can be approximately 0.16 inches (or approximately 10% of a total height of the basket 102), the outlet 106 can exhibit a diameter of 0.25 inches (or approximately 25% of a diameter of a float for the basket 102, or approximately 20% of an internal diameter at the base of the basket 102), and the basket 102 can exhibit an inner diameter at the bottom wall 108 of 1.16 inches (e.g., approximately 115% of a diameter of a float for the basket 102). For particular applications, these combinations of dimensions (and the ratios inherently embodied thereby), can provide for appropriate drainage of liquid along with appropriate retention of pressurized gases.

In order to selectively allow liquid to drain from the outlet 106 of the basket 102, while generally preventing gases from escaping along the same path, a substantially spherical ball float 118 is provided. Generally, the ball float 118 is configured to seat against a sealing surface of the valve seat wall 112 to prevent the egress of liquid or gases through of the outlet 106. However, as liquid enters the inlet 104 to fill the basket 102, buoyancy forces from the liquid eventually lift the ball float 118' off of the valve seat wall 112. In this way, for example, liquid (but generally not gases, except those entrained in the liquid) can be allowed to exit the basket 102 (and the relevant enclosure) via the outlet 106. When a sufficient amount of liquid has been thus released, the buoyancy forces will no longer support the weight of the ball float 118, and the ball float 118 will return to seat against the valve seat wall 112 and again prevent egress of liquids and gases through the outlet 106.

In order to ensure appropriate movement and sealing by the ball float 118, the ball float 118 can be configured with a diameter that allows it to move freely within the basket 102, while also providing a generally air-tight seal when seated against the valve seat wall 112. For example, the ball can exhibit a diameter of approximately 1 inch (e.g., approximately 85% of the smallest diameter of the basket 102, approximately 400% of the largest diameter of the outlet 106, approximately 640% the distance 110a, approximately 65% of the total height of the basket 102, or approximately 360% of the total vertical travel distance afforded the ball). Likewise, the ball float 118 can be configured with an appropriate density, based on the expected density of the liquid to be drained, so that the ball float 118 can be lifted off of the valve seat wall 112 before the basket 102 overflows.

In the illustrated embodiment, the ball float 118 is generally spherical. In other embodiments, other configurations are possible. Further, depending on the needs of a particular installation, the particular size, density, or other aspects of the ball float 118 can be selected based on a variety of factors, including the size (e.g., inner diameter) and volumetric capacity of the basket 102, the height of the projecting wall 110, the surface area or angle of the valve seat wall 112, the diameter of the outlet 106, and so on. In some embodiments, a float may exhibit a characteristic diameter (e.g., a diameter of a main spherical or other portion), with a number of peripheral structures (e.g., guides for vertical movement) extending beyond the characteristic diameter.

In some embodiments, additional features, such as ribs (or other protruding structures), catchment troughs, and so on, can be provided in order to assist in appropriate movement and sealing by a ball. For example, in the float drain 100, the basket 102 includes a plurality of protrusions configured as ribs 126, which extend radially away from the wall 128 into the basket 102, and axially along a main inner wall 128 of the basket 102. Generally, the ribs 126 can be configured so that appropriate clearance is provided between the ribs 126 and the ball float 118, thereby allowing the ball float 118 to move relatively freely within the basket 102. Further, appropriate clearance can be provided between the radially inner ends of the ribs 126 and the wall 128 so that debris (and liquid) can pass between the ball float 118 and the wall 128 even when the ball float 118 may be seated closely against one or more of the ribs 126. Similarly, the ribs 126 can help to keep the ball float 118 from seating too closely (e.g., from seating at all) against the wall 128. This may be useful, for example, to prevent the ball float 118 from sticking to the wall 128 (e.g., due to surface tension or other factors), which may prevent the ball float 118 from moving appropriately on and off of the valve seat wall 112. Further, the ribs 126 can generally help to guide the ball float 118 into appropriate engagement with the valve seat wall 112.

The trough 116 can also help to ensure appropriate movement and sealing by the ball float 118. For example, as debris (e.g., dirt and other particles) flows with the liquid into the basket 102, the debris can generally accumulate within the trough 116, rather than on the valve seat wall 112 or at other locations. Because the trough 116 is somewhat removed from (e.g., vertically below) the valve seat wall 112, the debris can accordingly be prevented from fouling the valve seat wall 112 (or other features, including the ball float 118), thereby helping to ensure proper sealing of the outlet 106 by the ball float 118.

The configuration of the sealing structure discussed above (e.g., the projecting wall 110 and the valve seat 112) can also be useful, including in helping the ball float 118 to establish an appropriate seal against egress of fluids through the outlet 106. For example, the height of the radially outer edges of the valve seat wall 112 can be selected so that liquid may need to rise substantially above the valve seat wall 112 before the resulting buoyancy forces cause the ball float 118 to move off of the valve seat wall 112. This may be useful, to further ensure minimal loss of air through the outlet 106.

As another example, as also discussed, above, the valve seat wall 112 exhibits an angle 112a relative to a plane that is perpendicular to the axis 102a. Accordingly, even if the ball float 118 is moved off-center relative the outlet 106, the force of gravity on the ball float 118 as the ball float 118 seats against the valve seat wall 112 can tend to re-center the ball float 118 for appropriate sealing. Further, as liquid drains below the upper end of the projecting wall 110, the angle 112*a* of the valve seat wall 112 can help to retain a small amount of liquid around the location of sealing contact between the valve seat wall 112 and the ball float 118. Again, this may be useful, for example, to further minimize loss of air through the outlet.

The angle 112*a* of the valve seat wall 112 can also be useful in the ease of angled installation of the float drain 100. For example, if the valve float drain 100 is inadvertently (or otherwise) installed with the axis 102*a* askew from vertical, the angle 112*a* of the valve seat wall 112 can help to ensure that the ball float 118 nevertheless establishes an appropriate seal.

Other aspects of the valve seat wall 112 can also be useful. For example, as illustrated in FIG. 2 in particular, with the ball float 118 centered over the outlet 106, the valve seat wall 112 contacts the ball float 118 at sealing locations distributed along an annular profile 130. In the embodiment illustrated, the annular profile 130 is disposed at a radial distance from the axis 102*a* that is substantially less than the diameter of the ball float 118 (e.g., at a radial distance that is equal to or less than one half the characteristic diameter of the ball float 118). In this regard, for example, the seal between the ball float 118 and the valve seat wall 112 can be established at sealing locations that are separated from each other (in the radial direction) by a relatively small distance (e.g., between 10% and 25% of the characteristic diameter of the ball float 118). In addition to other benefits, this configuration, combined with the angle 112*a* of the valve seat wall 112 can provide for a gap 132 between the ball float 118 and a radially outer portion of the valve seat wall 112 (see FIG. 2), when the ball float 118 is centered over the outlet 106.

This arrangement may be useful, for example, in enclosures that are internally pressurized. For example, at relatively low liquid levels, the top half of the ball float 118 can be exposed to a relatively substantial downward force from the pressurized atmosphere of the enclosure. However, as compared to conventional arrangements, the illustrated disposition of the profile 130 can generally reduce the area of the bottom half of the ball float 118 that is exposed to atmospheric pressure (e.g., via the outlet 106) while also increasing the area of the bottom half of the ball float 118 that is exposed to upward force from the pressurized atmosphere of the enclosure (e.g., via infiltration of pressurized air into the gap 132. Accordingly, the net downward force on the ball float 118 from the pressurization of the enclosure can be generally reduced as compared to conventional designs, so that a generally smaller buoyancy force from liquid within the basket 102 may be required to lift the ball float 118 off of the valve seat wall 112. In some cases, this can lead to generally more reliable drainage of liquid from the basket 102.

In different embodiments, different features can be provided in order to assist in installing a particular ball float drain for a particular enclosure. In the embodiment illustrated in FIGS. 1A, 1B, and 2, for example, a flange 140 extends radially outwardly from the basket 102 near the top of the float drain 100. The flange 140 exhibits a substantially planar top surface 142, which can be configured to abut the bottom surface of a panel of an enclosure in which the float drain 100 is to be installed. Near a peripheral edge of the flange 140, a recess 144 extends axially into the surface 142, as may be suitable to hold an O-ring, gasket, or other seal (see, e.g., FIG. 4). The diameter of the flange 140, and the location of the recess 144 in particular, can be selected, as appropriate, so that a seal within the recess 144 is generally disposed radially outside of a punch through the enclosure panel in which the float drain 100 may be installed (as also discussed below). (Generally, "punch" is used herein to indicate a hole or pattern of holes with one or more specially designed perimeter shapes.)

As illustrated in FIGS. 1B and 2 in particular, portions of the inner wall 128 of the basket 102 extend axially above the flange 140. This may be useful, for example, in order to support an attachment mechanism, such as components of a twist-lock arrangement 146 that extends radially outward from the basket 102. Generally, a twist-lock arrangement 146 can be designed so that the float drain 100 can be installed by passing the twist-lock arrangement through a punch in an enclosure panel, then rotating the float drain 100 (or components thereof) by a discrete amount (e.g., a quarter turn), in order to lock the float drain 100 in place.

Figure 3:
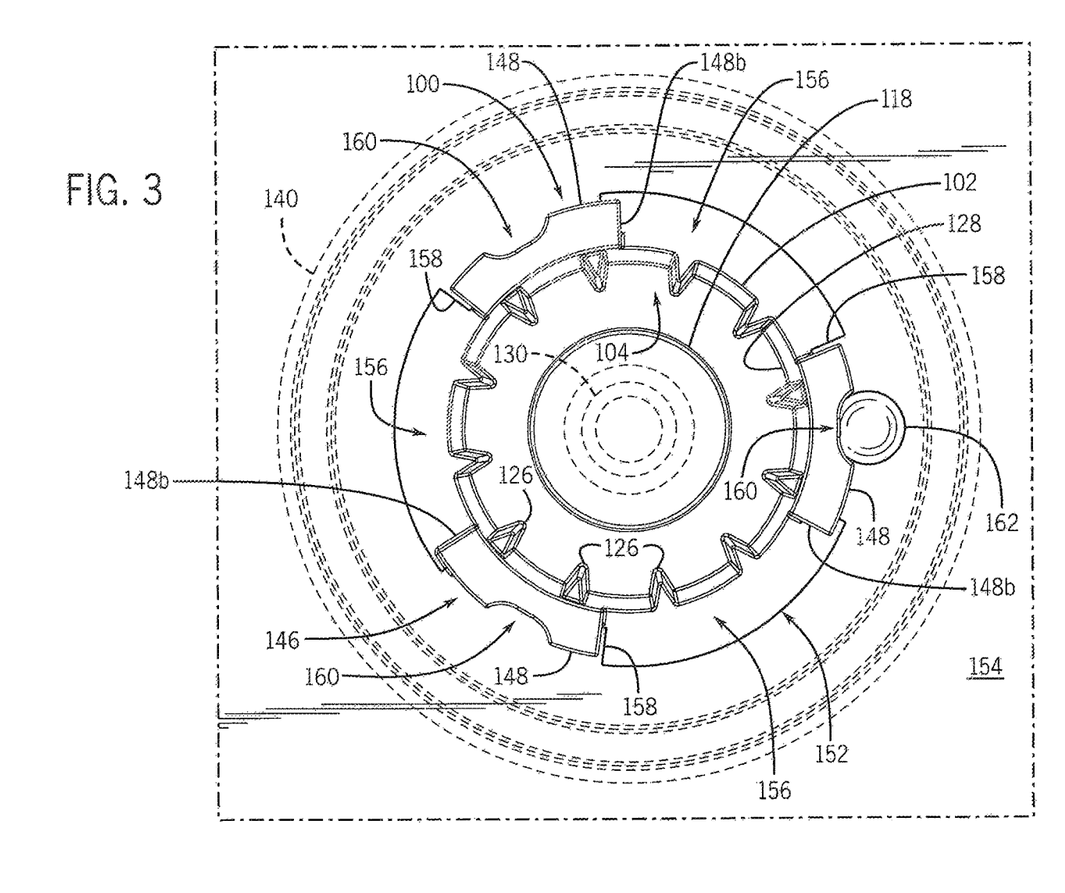
FIG. 3 is a top plan view of the ball float drain of FIG. 1A installed in a bottom panel of a hazardous-location enclosure, with a partial view of the enclosure.

Also as illustrated in FIGS. 1A and 1B, as well as in FIG. 3, the twist-lock arrangement 146 includes a number of locking tabs 148 distributed around the circumference of the basket 102 and spaced axially apart from the top surface 142 of the flange 140. The locking tabs 148 exhibit top surfaces that are generally perpendicular to the axis 102*a*, with lower surfaces 148*a* that angle downwardly along a counterclockwise circumferential direction (see, e.g., FIG. 1B). Accordingly, as illustrated in FIG. 2 in particular, respective gaps 150 between the locking tabs 148 and the top surface 142 of the flange 140 can vary between a maximum spacing 150*a* and a minimum spacing 150*b*, at opposite sides of each of the locking tabs 148.

In the embodiment illustrated, three substantially similar locking tabs 148 are provided, distributed regularly around the circumference of the basket 102, with uniform circumferential spacing between adjacent pairs of the tabs 148. In other embodiments, other arrangements are possible. For example, in other embodiments, a set of differently sized, non-uniformly spaced, or other locking tabs can be provided.

Figure 4:
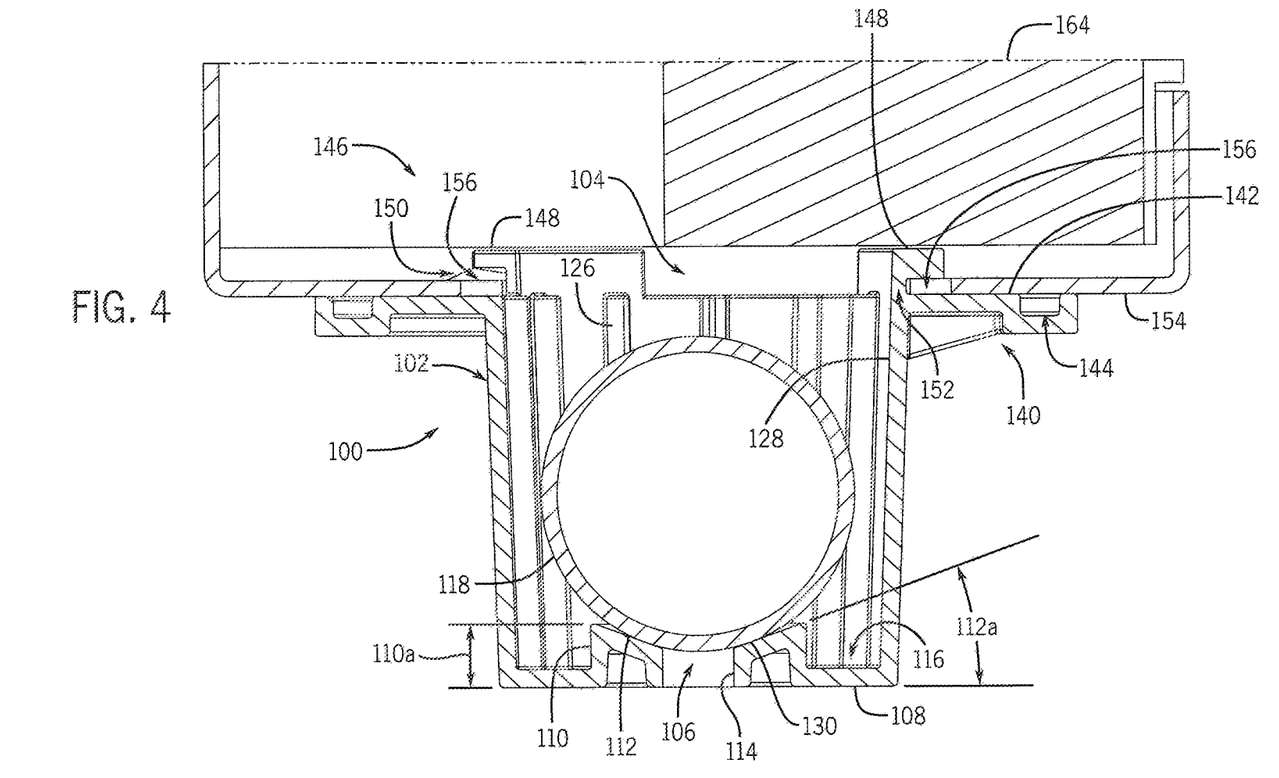
FIG. 4 is a sectional view of the ball float drain of FIG. 1A installed in the bottom panel of the hazardous-location enclosure of FIG. 3, taken from a similar perspective as FIG. 2.
Figure 5:
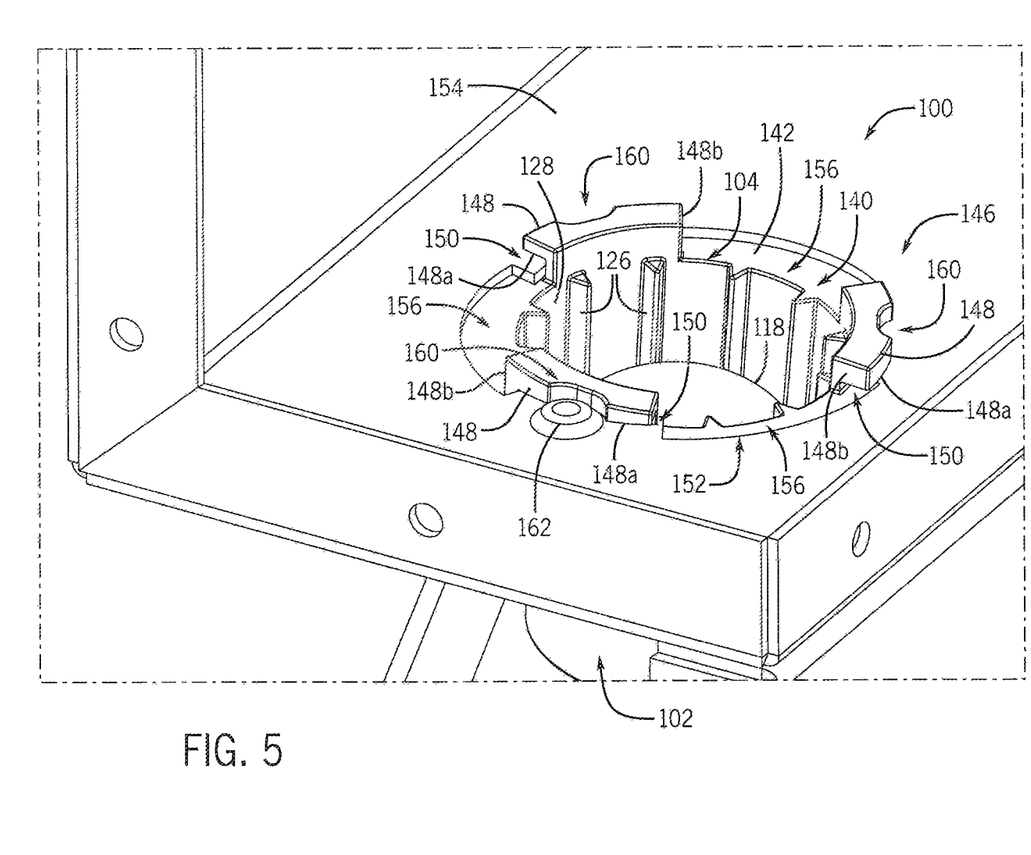
FIG. 5 is a perspective view of the installation illustrated in FIG. 4.

As illustrated in FIGS. 3 through 5 in particular, a generally circular (or other) punch 152 can be provided in a panel 154 of an enclosure, with lobes 156 of the punch 152 extending radially outward over a portion of the circumference of the punch 152, and being separated by teeth 158 formed from of the remaining material of the panel 154. To install the float drain 100, the locking tabs 148 can be inserted through the lobes 156, so that the locking tabs 148 are disposed on one side (e.g., the inside) of the panel 154 and the flange 140 is disposed on an opposite side (e.g., the outside) of the panel 154. The float drain 100 (or a portion thereof) can then be rotated so that the locking tabs 148 are generally disposed in alignment with the teeth 158 of the panel 154 and the teeth 158 correspondingly, preventing axial movement of the float drain 100 away from the enclosure. In some embodiments, as illustrated in FIG. 5 in particular, interior portions of circumferential end walls 148*b* of the locking tabs 148 can be configured to abut edges of the respective teeth 158 when the float drain 100 has been rotated into an appropriate orientation.

Once installed (e.g., as described above), the float drain 100 can accordingly be retained against axial removal from the panel 154, while still be susceptible to intentional removal (e.g., by the reverse of the process described above). Further, due to the downward angle of the lower surfaces 148*a* of the locking tabs 148, rotation of the float drain 100 to align the tabs 148 with the teeth 158 can draw the flange 140 towards the panel 154, in order to seat a seal within the recess 144 against the panel 154 and thereby seal the arrangement against egress of liquid or gas except via the outlet 106. In this regard, for example, it may be useful to configure the maximum spacing 150a between the locking tabs 148 and the flange 140 to easily accommodate the thickness of the panel 154, with the minimum spacing 150b between the locking tabs 148 and the flange 140 being close to (e.g., equal to or slightly small than) the thickness of the panel 154 (e.g., to provide a friction-fit engagement).

In some embodiments, other features can be provided. For example, as illustrated in FIGS. 1, 3 and 5 in particular, a rounded recess 160 extends inwardly from the radially outer perimeter of each of the locking tabs 148. A locking dimple 162 (see, e.g. FIGS. 3 and 5) or other feature can be disposed on the panel 154, or elsewhere within a relevant enclosure, to engage the recesses 160 when the float drain 100 has been rotated into its installed configuration relative to the panel 154. Accordingly, a threshold application of force may be required in order to rotate the float drain 100 in the opposite direction for removal from the enclosure, thereby securing the float drain 100 against accidental or incidental removal. In this regard, for example, it may be useful to configure the locking tabs 148 to exhibit sufficient flexibility so as to resiliently flex as the recesses 160 are moved into or out of engagement with the dimple 162. Similarly, in some embodiments, one or more of the locking tabs 148, the dimple 162, or other features can be configured to require direct manual (or other intervention) before the float drain 100 can be removed from its installed configuration.

In some embodiments, the dimple 162 can be formed by pressing a tool against the opposite side of the panel 154, in order to "push up" the dimple 162 relative to the remainder of the panel 154,. In some embodiments, the dimple 162 can be formed in different ways, or can be supplemented (or replaced) with another feature (e.g., a screw or other hardware).

In the embodiment illustrated, each of the tabs 148 includes a respective one of the recesses 160s. This may be useful, for example, so that the dimple 162 can be engaged regardless of the particular rotational orientation with which the float drain 100 is inserted into the punch 152. In other embodiments, other configurations are possible.

In some implementations, the float drain 100 can be secured to the panel 154 with the ball float 118 already disposed within the basket 102. In some implementations, particularly where the interior of the enclosure and the interior of the basket 102 can be easily accessed after the float drain 100 is installed, the ball float 118 can be placed into the basket 102 after the basket 102 is secured to the panel 154.

Via the installation method discussed above, or other methods, the twist-lock arrangement 146 of the float drain 100 can usefully allow the float drain 100 to be installed onto (or removed from) an enclosure without requiring access to the interior of the enclosure. For example, with the ball float 118 disposed in the basket 102, the assembly can be aligned with and inserted through the punch 152, then twisted to be locked into place, entirely from the exterior of the enclosure. Similarly, the ability to lock the float drain 100 into place with limited (e.g., quarter-turn) rotation can allow for relatively easy installation, particularly when access to the relevant areas (e.g., the underside of the relevant enclosure) may be limited.

With the float drain 100 installed as illustrated in FIGS. 3 through 5, the float drain 100 can function as a generally air-tight fluid drain. For example, water within the enclosure can flow through inlet 104 and past the ball float 118 (e.g., through spaces between the ribs 126), and can accumulate in the trough 116. Initially, with a relatively low level of liquid in the basket 102 (and the trough 116), the ball float 118 can remain seated against the valve seat wall 112 (e.g., as aided by the net downward force on the ball float 118 from the pressurized atmosphere of the enclosure, the weight and composition of the ball float 118, the angle 112a of the valve seat wall 112, and so on). This can generally seal the outlet 106 against egress of fluid (e.g., pressurized air) from the enclosure. As the liquid continues to flow into the basket 102, debris may also enter the basket 102, with the ribs 126 and the trough 116 helping to prevent the debris from interfering with operation of the float drain 100, as also described above.

As liquid level within the basket 102 rises above the projecting wall 110, the liquid can start to impose an upwardly oriented buoyancy force on the ball float 118 (e.g., in an opposite direction as the net downward force from gravity and the pressurized atmosphere of the enclosure). With sufficiently high liquid levels, increasing buoyancy forces can result in a net upward force on the ball float 118, thereby causing the ball float 118 to rise off of the valve seat wall 112 and allowing liquid to flow through the outlet 106 and out of the enclosure. With sufficient draining of liquid, the ball float 118 can then return to the valve seat wall 112, again sealing the outlet 106 against egress of fluid.

In general, various aspects of the float drain 100 (or other embodiments of the invention) can be optimized, as appropriate, to ensure only liquid (or substantially only liquid) escapes through the outlet 106, including when the ball float 118 is unseated from the valve seat wall 112. For example, the distance 110a (see, e.g., FIG. 2), the angle 112a (see, e.g., FIG. 2), the radial extend of the valve seat wall 112, the diameter of the ball float 118, the diameter of the basket 102, the radial extent of the ribs 126, and so on can be optimized for a particular installation or desired set of operational characteristics.

As one example, in some embodiments, the radial extend of the valve seat wall 112 can be approximately 0.75 inches (or approximately 300% of the diameter of the outlet 106 or approximately 75% of the diameter of the ball float 118). Similarly, in some embodiments, the ribs can extend approximately 0.09 inches from the inner wall 128 (e.g., approximately 9% of the characteristic diameter of the ball float 118 or approximately 60% of the distance between the inner wall 128 and the ball float 118, when the ball float 118 is centered over the outlet 106). Likewise, in some embodiments, the ball float 118 can be separated from the inner wall 128 of the basket 102 by approximately 0.15 inches when the ball float 118 is centered over the outlet 106 (e.g., by approximately 15% of the characteristic diameter of the ball float 118).

In some installations, various features can be provided on a ball float drain or on a related structure (e.g., a relevant enclosure) than can further assist in retaining a ball within a relevant basket. For example, as illustrated in FIG. 4, a feature of the enclosure, such as a refrigerator coil 164, can be generally disposed above the float drain 100, when the float drain 100 is secured to the panel 154. Accordingly, the refrigerator coil 164 (or other feature) can generally limit the travel distance of the ball float 118 within the basket 102 (e.g., to approximately one quarter of the diameter of the ball float 118), as well as prevent the ball float 118 from escaping the basket 102 (e.g., if the outlet 106 becomes clogged or overwhelmed by excessive liquid accumulation, and the basket 102 over-fills with liquid).

As noted above, the trough 116 can generally serve to accumulate debris, as well as liquid, in order to prevent debris from interfering with operation of the ball float 118, and of the float drain 100 generally. In some embodiments, the twist-in and -out installation described above (e.g., utilizing the locking tabs 148) can allow for relatively easy cleaning of the trough 116. For example, as excessive debris accumulates in the trough 116, it may be relatively easy to remove the float drain 100 from the enclosure, clean any accumulated debris from the basket 102 (and, as appropriate, from the ball float 118 or other components), then reinstall the float drain 100 (e.g., as described above) for continued operation.

Figure 6:
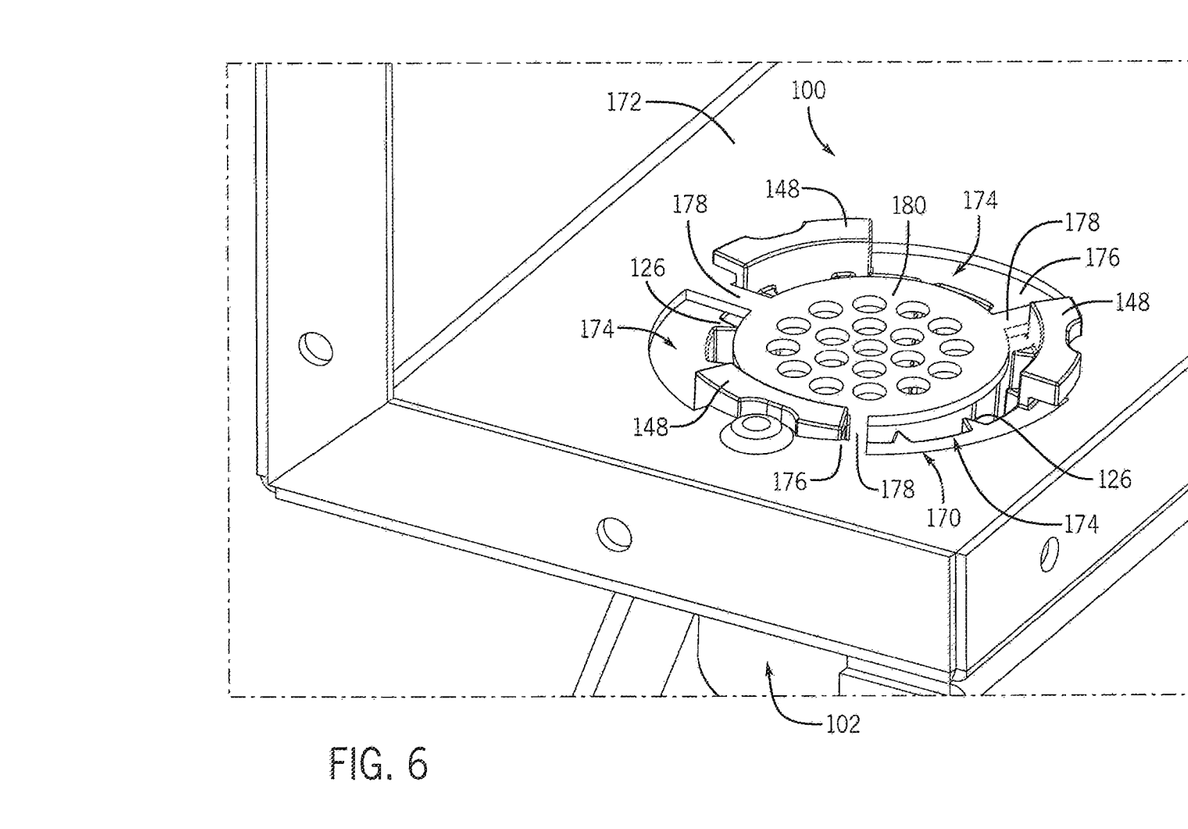
FIG. 6 is a perspective view of another installation of the ball float drain of FIG. 1 in a hazardous-location enclosure.

In the enclosure illustrated in FIG. 5, the punch 152 in the panel 154 is generally configured as an unobstructed opening, with the radially extending lobes 156 circumferentially separated by the teeth 158, as also described above. In other enclosures, other configurations are possible. For example, in the enclosure illustrated in FIG. 6, a punch 170 in a panel 172 defines lobes 174 and teeth 176 similar to the lobes 156 and the teeth 158 that are defined by the punch 152 (see FIG. 5). As such, the float drain 100 can be installed in the punch 170 in a similar fashion as described above for the punch 152 and the panel 154. In contrast to the punch 152, however, the punch 170 also includes struts 178 that extend radially inward from the outer perimeter of the punch 170 to support a grating 180 with a plurality of drainage holes. In some cases, this configuration (or other similar arrangements) can further assist in preventing debris from interfering with operation of the float drain 100. For example, the grating 180 can generally prevent a large proportion of debris from entering the basket 102 at all, thereby further reducing the likelihood that debris within the basket 102 will impede operation of the ball float 118.

Figure 7:
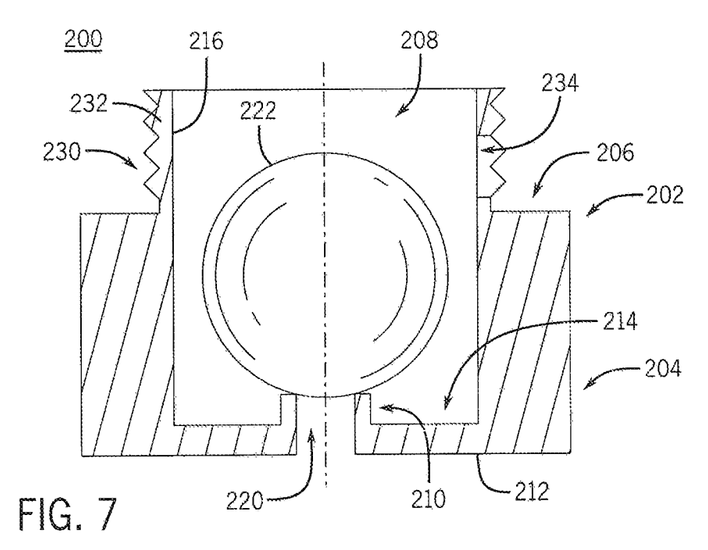
FIG. 7 is a diametric sectional view of a ball float drain for an enclosure, according to one embodiment of the invention.
Figure 8:
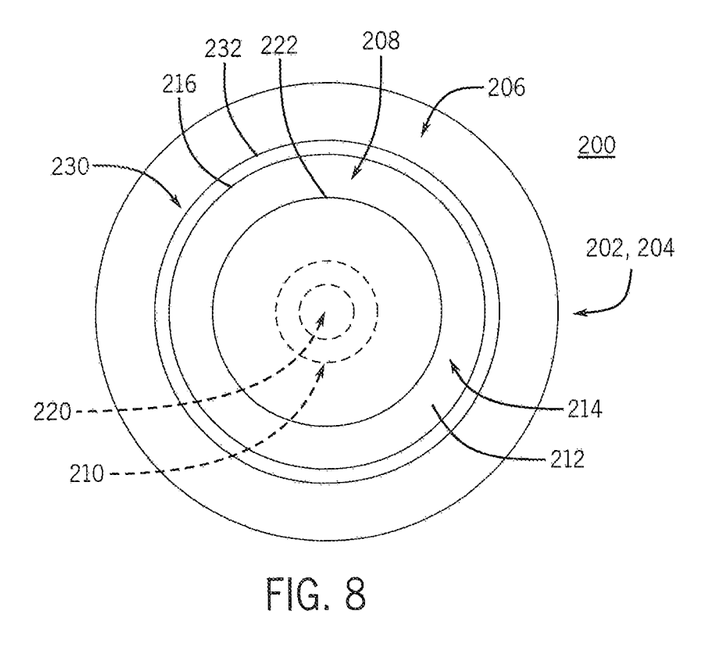
FIG. 8 is a top plan view of the ball float drain of FIG. 7.

In other embodiments, other configurations are possible. For example, FIGS. 7 and 8 illustrate a ball float drain 200 according to an embodiment of the invention. Similarly to the float drain 100, the float drain 200 can be configured to drain liquids (e.g., condensate water) and prevent loss of pressurized air from a pressurized enclosure. In some aspects, however, the float drain 200 can differ from the float drain 100

In the embodiment illustrated, the float drain 200 includes a drain body with a basket 202. A wider bottom portion 204 of the drain body generally defines an exterior cylindrical shoulder 206 facing towards an upper inlet 208 of the basket 202. At an opposite end of the basket 202, a sealing structure configured as a generally cylindrical valve seat 210 extends away from a bottom wall 212 to define a trough 214 between the valve seat 210 and an inner wall 216 of the basket 202. A generally cylindrical channel extends through the valve seat 210 to provide an outlet 220.

A ball float 222 with appropriate dimensions, buoyancy, and other characteristics (e.g., characteristic diameter) can be selected for inclusion in the basket 202. Similarly to the ball float 118 (see, e.g., FIG. 1A), the ball float 222 can be floated off of the valve seat 210 by accumulated liquid, to allow flow of liquid out of the outlet 220, and can seat against the valve seat 210, when liquid levels drop sufficiently, to prevent flow of out of the outlet 220. Generally, characteristics of the ball float 222, and of the basket 202, can be selected based on similar considerations as discussed above with regard to the float drain 100. For example, the height of the valve seat 210 can be selected based on buoyancy considerations.

To assist in attaching the basket 202 to a relevant enclosure, an attaching portion 230 of the basket 202 extends above the shoulder 206 and around the inlet 208. In the embodiment illustrated, the attaching portion 230 includes external threads 232, with a number of channels 234 (see, e.g., FIG. 7) extending therethrough into the interior of the basket 202. As also discussed below, the channels 234 (only one shown) can provide additional side (e.g., radial) inlets for liquid.

Figure 9:
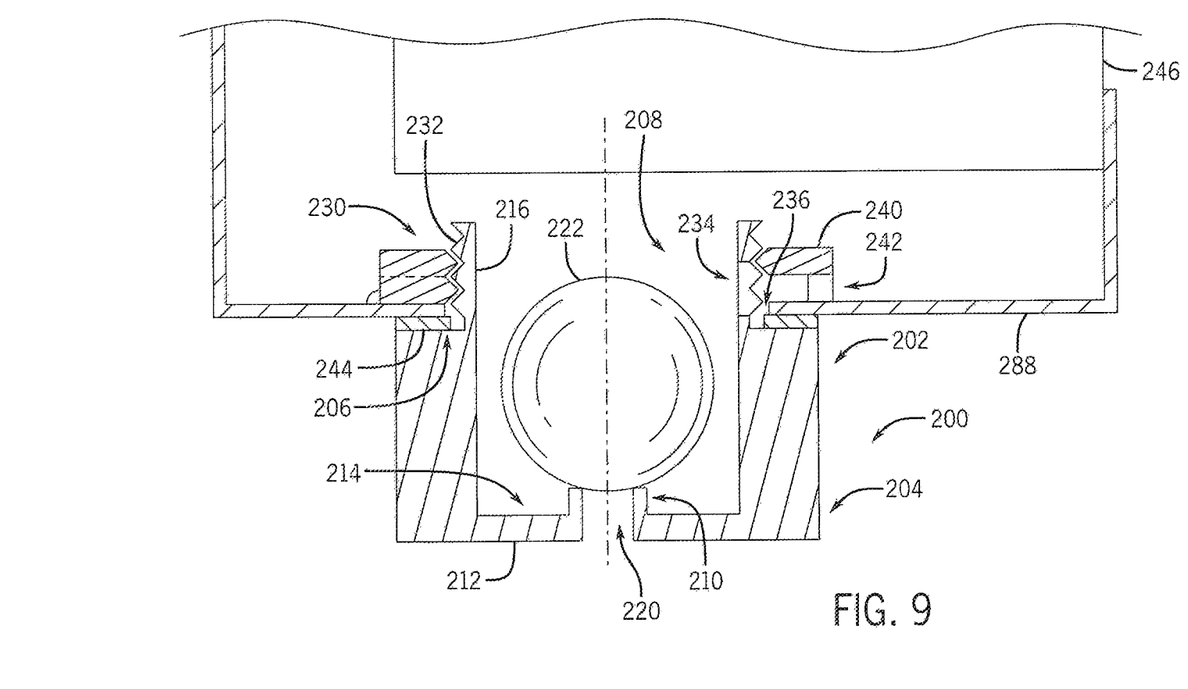
FIG. 9 is a sectional view of the ball float drain of FIG. 7, installed in a bottom panel of a hazardous-location enclosure, with a partial view of the enclosure.

As illustrated in FIG. 9, to attach the float drain 200 to an enclosure, the attaching portion 230 can be inserted through a generally circular (or other) punch 236 in a bottom panel 238 of an enclosure. A permeable-structure fastener, such as a castle nut 240 with slots 242, can then be threaded onto the threads 232 of the attaching portion 230, in order to secure the float drain 200 to the panel 238. Further, with appropriate tightening of the nut 240 (or other fastener), a gasket 244 (or other seal) can, be appropriately compressed between the shoulder 206 of the basket 202 and the panel 238 in order to provide an air- and water-tight seal.

With the float drain 200 thus installed, water can flow into the basket through the inlet 208, as well as through the slots 242 and the channels 234. Usefully, in the illustrated arrangement, the extension of the attaching portion 230 above the top surface of the panel 238, as well as the relatively small size of the slots 242 and the channels 234, can helpfully prevent larger debris from entering the basket 202. Also as illustrated, the attaching portion 230 extends into relatively close proximity to an internal component 246 (e.g., a refrigerator coil) of the enclosure. The relatively small clearance between the component 246 and the top of the float drain 200 can further serve to filter out larger debris.

As liquid flows into the basket 202, the float drain 200 can operate similarly to the float drain 100 to release liquid, but not gas through the outlet 220. Further, similarly to the trough 116 of the float drain 100, the trough 214 of the float drain 200 can help to trap debris that might otherwise clog the outlet 220 or interfere with the seal between the ball float 222 and the valve seat 210.

Similarly to the float drain 100, in some implementations, the float drain 200 can also be installed without requiring access to the interior of the relevant enclosure. For example, where a threaded body such as the castle nut 240 is pre-secured to the panel 238 (e.g., welded to, adhered to, or integrally formed with the panel 238), the float drain 200 can be threaded into the nut 240 without the need to access the interior of the enclosure.

Figure 10:
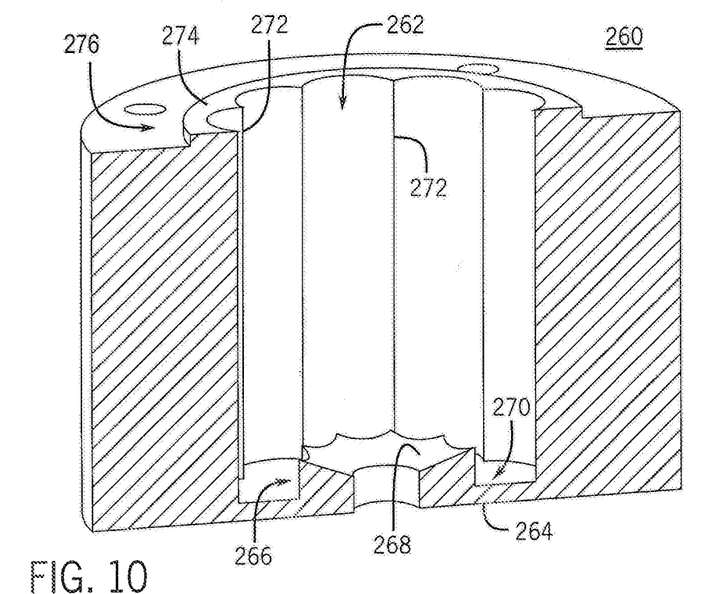
FIG. 10 is a diametric sectional perspective view of a basket for a bail float drain for an enclosure, according to one embodiment of the invention.
Figure 11:
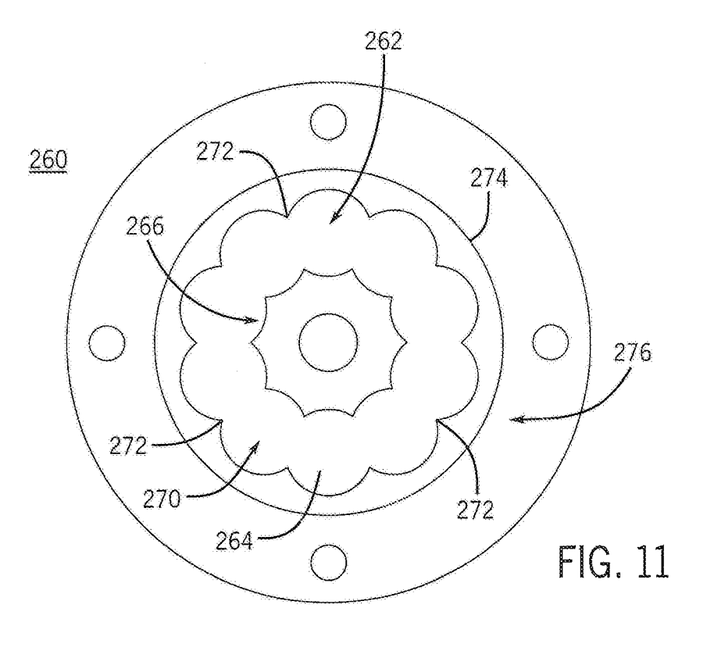
FIG. 11 is a top plan view of the basket of FIG. 10.

In other embodiments, other configurations are possible. For example, FIGS. 10 and 11 illustrate a basket 260 for a float drain according to one embodiment of the invention. In many regards, the float drain 260 can be configured, and can operate, similarly to the float drain 200 or the float drain 100. However, the float drain 260 can differ in some aspects from either of the float drains 100 and 200. For example, the internal cavity of a basket 260 can be formed via drilling (or similar machining), so that a series of overlapping cylindrical blind bores extend from an inlet 262 of the basket 260 to a bottom wall 264 of the basket. Generally, these overlapping bores can define a raised valve seat 266, which can include an angled sealing surface 268 (e.g., similar to the valve seat wall 112 illustrated in FIGS. 2 and 4), and is generally surrounded by a trough 270 (e.g., similar to the trough 116 illustrated in FIGS. 2 and 4). Further, the intersections 272 of the overlapping bores can provide a ribbed profile for the inner wall of the basket 260 (as well as for the outer wall of the valve seat 266). In some embodiments, the intersections 272 can function similarly to the ribs 126 of the float drain 100 (see, e.g., FIG. 1A), with regard to movement of a float (not shown) within the basket 260.

In the embodiment illustrated, the basket 260 includes a relatively short projection 274 extending axially above a shoulder 275. In some embodiments, this projection 274 can be threaded (e.g., similarly to the attaching portion 230 of the basket 202 illustrated in FIGS. 7-9) or otherwise configured (e.g., equipped with tabs similar to the locking tabs 148 illustrated in FIGS. 1A through 6) to allow the basket 260 to be secured to an enclosure. In some embodiments, other attachment configurations are possible. For example, the projection 274 can be configured to slide axially into an opening in an enclosure, with a gasket (not shown) sealing against the shoulder 276, and fasteners (not shown) extending, through a sealed or other interface, from the enclosure into bores on the shoulder 276.

In the example embodiments illustrated in FIGS. 1A through 11, each of the floats for the various float drains are configured as ball floats. In some embodiments, solid ball floats can be provided. In some embodiments, ball floats can be hollow (e.g., with thin spherical shells) or can include internal structures, voids, inclusions of different types of materials, and so on. In some embodiments, non-ball floats can be used.

Although particular features may be included only in some embodiments discussed above, the features of any of the embodiments above can be generally added, substituted for, or otherwise combined with features of ether embodiments. For example, the twist-lock arrangement 146 of the float drain 100 can be used in place of threads on embodiments of the invention that ate otherwise similar to the float drains 200 (or vice versa). Similarly, for example, the angled valve seat wall of the float drain 100 can be used in place of the non-angled valve seat 210 of the float drain 200.

Thus, embodiments of the invention provide for improved electric motors and associated (e.g., control) systems, as well as related manufacturing and operating methods. In some embodiments, for example, use of the disclosed approaches can significantly lower weight relative to conventional designs, as well as improving operational characteristics at higher frequencies.

The included description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A float drain and enclosure assembly comprising:
   a panel forming a portion of an enclosure, the panel defining a punch having radially extending lobes circumferentially separated by respective teeth, wherein one or more struts extend from between at least one of the lobes and at least one of the teeth to support a grating with a plurality of drainage holes;
   a basket to collect liquid from the enclosure, the basket including a bottom wall and including a locking arrangement configured to engage the teeth to secure the basket in alignment with the punch;
   a sealing structure that extends away from the bottom wall, the sealing structure including a sealing surface that surrounds an outlet of the basket; and
   a float configured to:
      in a sealing configuration, seat against the sealing surface to prevent fluid flow out of the outlet; and
      rise off of the sealing surface, due to buoyancy forces from the liquid as the liquid collects in the basket, to allow the liquid to flow out of the outlet;
   the basket having a plurality of ribs extending at least partly radially inwardly into an interior area of the basket to at least partly separate the float from an inner wall of the basket.

2. The float drain and enclosure assembly of claim 1, wherein a lower portion of the basket includes a trough to collect debris carried by the liquid, the trough at least partly surrounding the sealing structure.

3. The float drain and enclosure assembly of claim 2, wherein the one or more struts and the grating are integrally formed with the panel of the enclosure.

4. The float drain and enclosure assembly of claim 1, wherein the plurality of ribs extend inwardly of the teeth.

5. The float drain and enclosure assembly of claim 1, wherein the sealing surface includes a frustoconical wall surrounding the outlet of the basket, the frustoconical wall angling downwardly along a radially inward direction.

6. The float drain and enclosure assembly of claim 5, wherein the float exhibits a characteristic diameter; and
   wherein the sealing surface is configured to contact the float at sealing locations that are separated from each other in a radial direction by between 10 % and 25 % of the characteristic diameter of the float.

7. The float drain and enclosure assembly of claim 1, further comprising:
   a flange extending outwardly around the perimeter of the basket, the flange defining an upward-opening recess extending axially into the flange and configured to maintain a seal therein between the flange and a bottom side of the panel of the enclosure.

8. The float drain and enclosure assembly of claim 1, wherein the locking arrangement includes:
   a plurality of locking tabs spaced around a perimeter of the basket, each of the locking tabs being spaced apart from at least an adjacent one of the locking tabs in a circumferential direction; and
   a flange extending around the perimeter of the basket to define at least one gap between the flange and the locking tabs;
   wherein the at least one gap is configured to receive at least one of the teeth of the panel of the enclosure, with the locking tabs on an opposite side of the panel of the enclosure from the flange, to secure the float drain to the panel of the enclosure.

9. The float drain and enclosure assembly of claim 1, wherein at least a portion of a boundary of the grating is separated from the radially extending lobes and the teeth by a gap and the plurality of ribs are disposed below the gap in an axial direction, the plurality of ribs terminating axially above at least a portion of a flange extending around the perimeter of an upper portion of the basket.

10. The float drain and enclosure assembly of claim 1, further comprising:
   an anti-rotation feature formed integrally with the panel; and
   a locking tab extending from a perimeter of the basket, the locking tab being configured to engage with the anti-rotation feature to secure the basket against rotation relative to the panel.

11. A float drain and enclosure assembly comprising:
   a panel forming a portion of an enclosure, the panel defining a punch having at least one lobe, and one or more integrally formed struts supporting a grating with a plurality of drainage holes;

a basket to collect liquid from the enclosure, the basket including an inner wall and a bottom wall;
a sealing structure that includes a sealing surface, the sealing surface surrounding an outlet of the basket; and
a float configured to:
  seat against the sealing surface to prevent fluid flow out of the outlet; and
  rise under buoyancy forces from the liquid to allow the liquid to flow out of the outlet;
the sealing structure including a projecting wall that extends away from the bottom wall of the basket to support the sealing surface;
the projecting wall defining, in cooperation with the inner wall of the basket, a trough to collect debris carried by the liquid; and
the basket including a locking arrangement that includes:
  at least one locking tab opposite the bottom wall; and
  a flange that extends around the basket to define at least one gap between the flange and the at least one locking tab;
  the at least one locking tab being configured to extend through the at least one lobe so that the at least one gap receives the panel of the enclosure to secure the float drain to the panel.

12. The float drain and enclosure assembly of claim 11, wherein the sealing surface extends at least partly towards the bottom wall of the basket, from a perspective moving radially inwardly from the projecting wall of the sealing structure.

13. The float drain and enclosure assembly of claim 12, wherein the float seats against the sealing surface at a sealing location that is radially inward of the projecting wall.

14. The float drain and enclosure assembly of claim 13, wherein the punch further defines teeth, the struts extending inwardly of the teeth.

15. The float drain and enclosure assembly of claim 14, further comprising:
  a plurality of structures extending at least partly radially inwardly into an interior area of the basket to at least partly space the float apart from the inner wall of the basket, the plurality of structures extending axially above and below the float.

16. The float drain and enclosure assembly of claim 13, wherein the float seats against the sealing surface at multiple sealing locations that are radially inward of the projecting wall, with the sealing locations being separated from each other in a radial direction by between 10% and 25% of a maximum diameter of the float.

17. The float drain and enclosure assembly of claim 11, wherein the float is configured to be retained within the basket by the grating.

* * * * *